(12) United States Patent
Takahashi

(10) Patent No.: US 7,822,642 B2
(45) Date of Patent: Oct. 26, 2010

(54) NETWORK FACSIMILE APPARATUS

(75) Inventor: Jun Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1902 days.

(21) Appl. No.: 10/601,961

(22) Filed: Jun. 18, 2003

(65) Prior Publication Data

US 2004/0001225 A1     Jan. 1, 2004

(30) Foreign Application Priority Data

Jul. 1, 2002    (JP)   ............... 2002-192072

(51) Int. Cl.
     *G06Q 30/00*      (2006.01)
(52) U.S. Cl. .......................... 705/26; 705/37
(58) Field of Classification Search .................. 705/26, 705/37
See application file for complete search history.

(56) References Cited

U.S. PATENT DOCUMENTS

| | | | |
|---|---|---|---|
| 5,872,638 A | 2/1999 | Haze | |
| 6,188,488 B1 | 2/2001 | Kato | |
| 7,230,733 B2 * | 6/2007 | Adegawa | .................. 358/1.15 |
| 2002/0063904 A1 | 5/2002 | Suzuki | |

FOREIGN PATENT DOCUMENTS

| | | |
|---|---|---|
| JP | 10098606 | 4/1998 |
| JP | 10322540 | 12/1998 |
| JP | 2000261640 | 9/2000 |

OTHER PUBLICATIONS

Anonymous, Library Technology "Choosing a more productive, economical fax machine", Library Technology Reports. Chicago: Mar./Apr. 1998. vol. 34, Iss. 2; p. 235, downloaded from ProQuest on the Internet on Nov. 21, 2009, 18 pages.*
Eric Carr, Product comparison—Fax server software gets the fax right, Network Computing, Manhasset, Apr. 1, 1995, p. 104, downloaded from ProQuest Direct on the Internet on Nov. 22, 2009, 6 pages.*
Peter Davidson, Fax servers send a cost-effective message, Network World, Southborough, Jan. 25, 1993, vol. 10, iss. 4, p. 32, downloaded fro ProQuest Direct on the Internet on Nov. 22, 2009, 6 pages.*
Steve Kalman, A new route for faxes, Network World, Southborough, Sep. 2, 1996, vol. 13, iss. 36, downloaded fro ProQuest Direct on the Internet on Nov. 22, 2009, 4 pages.*
Andre Kvitka, Fax servers lower costs, ease administration, Federal Computer Week, Falls CHurch, Feb. 8, 1999, vol. 13, iss. 3, p. 34, downloaded fro ProQuest Direct on the Internet on Nov. 22, 2009, 9 pages.*
Patrick Marshall, Fax Sr. surpasses RightFax in meeting the needs of the enterprise, InfoWorld, San Mateo, Aug. 11, 1997, vol. 19, iss. 32, p. 104, downloaded fro ProQuest Direct on the Internet on Nov. 22, 2009, 5 pages.*

* cited by examiner

*Primary Examiner*—James Zurita
(74) *Attorney, Agent, or Firm*—Cooper & Dunham LLP

(57) ABSTRACT

A communication management report is produced from communication management information stored, and is transmitted to predetermined destinations via electronic mail when a predetermined requirement is met.

9 Claims, 14 Drawing Sheets

FIG.7A
(STANDBY MODE)

```
MEMORY TRANSMISSION        AUGUST 31 (TUE)17:15
SET DRAFT AND SPECIFY DESTINATION

MEMORY REMAINING: 100%
```

↓ [PREDETERMINED OPERATION]

FIG.7B
(COMMUNICATION MANAGEMENT REPORT DESTINATION INPUT MODE)

```
COMMUNICATION          INPUT DESTINATION
MANAGEMENT                                        INPUT EXAMPLE:
REPORT DESTINATION                                abc@xxx.yyy.zz
                       PRESS [YES]
■■■■■■■■■■             AFTER INPUT
```

↓ [DESTINATION INPUT]

FIG.7C
(COMMUNICATION MANAGEMENT REPORT DESTINATION INPUT MODE)

```
COMMUNICATION
MANAGEMENT
REPORT DESTINATION    PRESS [YES] IF OK,
                      OTHERWISE PRESS [NO]
abc@xxx.yyy.zz        TO CORRECT
```

↓ [PRESS YES KEY]

FIG.7D

```
COMMUNICATION
MANAGEMENT
REPORT DESTINATION                                SELECT
                                                  REPORTING WAY
DESTINATION: abc@xxx.yyy.zz
REPORT IN AUTOMATIC OUTPUT TIMING:
ON/OFF [↑][↓]
```

↓ [PRESS ↓ KEY]

FIG.7E

```
COMMUNICATION
MANAGEMENT
REPORT DESTINATION                                SELECT
                                                  REPORTING WAY
DESTINATION: abc@xxx.yyy.zz
REPORT UPON EXCESS OF FIXED CHARGE:
ON/OFF [↑][↓]
```

FIG.8

* MAIL REPORT SETTING LIST (DEC.18, 2001 17:00) *

| COMMUNICATION MANAGEMENT REPORT DESTINATION | REPORTING TIMING | |
|---|---|---|
| abc@xxx.yy.zz | REPORT IN AUTOMATIC TIMING | OFF |
| | REPORT UPON EXCESS OF FIXED CHARGE | ON |
| | REPORT UPON EXCESS OF FIXED COUNT | OFF |
| | PERIODIC REPORT | 30DAYS 17:30 |
| | PERIODIC REPORT ON TRANSMISSION ERROR | ON EVERY 2 HRS |
| ccc@xxx.yy.zz | REPORT IN AUTOMATIC TIMING | ON |
| | REPORT UPON EXCESS OF FIXED CHARGE | OFF |
| | REPORT UPON EXCESS OF FIXED COUNT | OFF |
| | PERIODIC REPORT | OFF |
| | PERIODIC REPORT ON TRANSMISSION ERROR | OFF |
| .... | .... | .... |

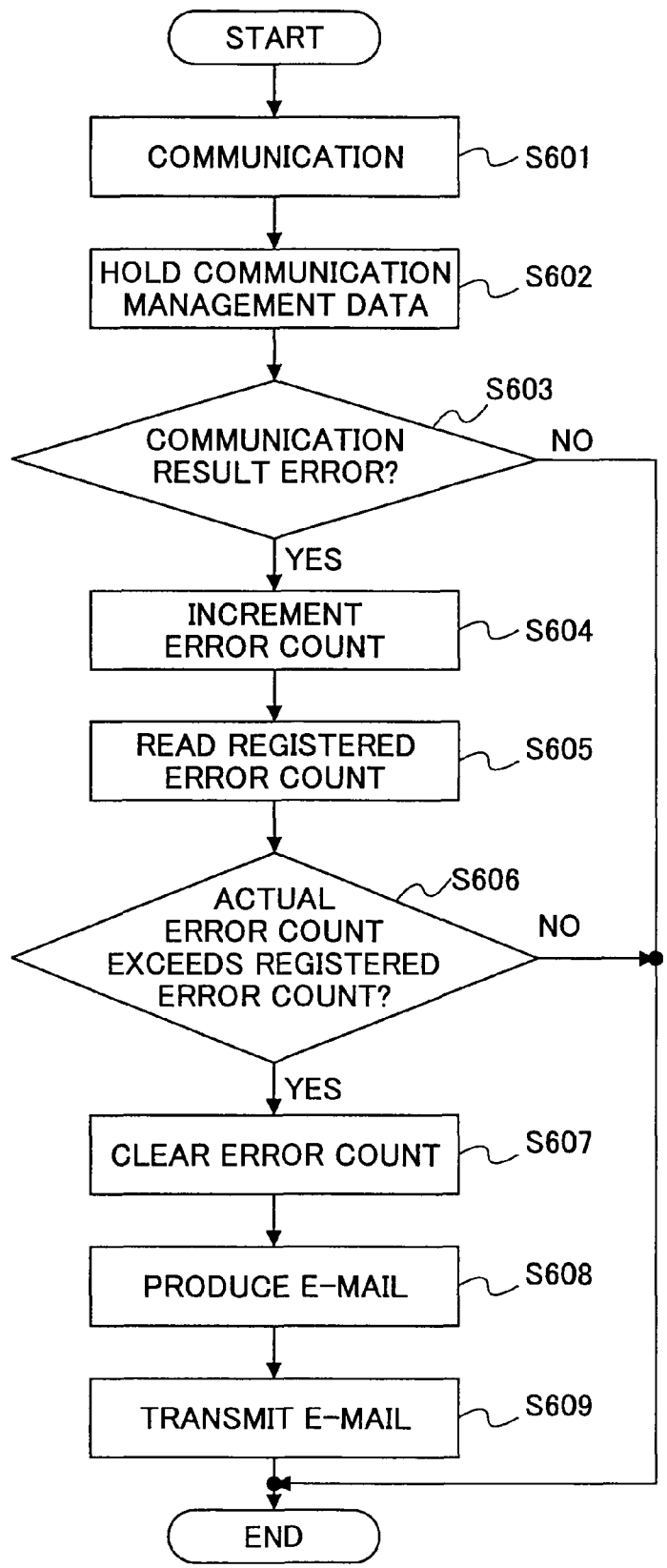

FIG.11A (STANDBY MODE)

```
MEMORY TRANSMISSION    AUGUST 31 (TUE)17:15
SET DRAFT AND SPECIFY ADDRESS

MEMORY REMAINING: 100%
```

↓ [PREDETERMINED OPERATION]

FIG.11B (COMMUNICATION ERROR COUNT INPUT MODE)

```
COMMUNICATION ERROR    INPUT
COUNT NUMBER           COUNT NUMBER

PRESS[YES]
■ ■ ■
```

[INPUT '005']

↓ [COMMUNICATION ERROR COUNT NUMBER]

FIG.11C

```
COMMUNICATION ERROR
COUNT NUMBER

PRESS[YES], OR
                  PRESS[NO] TO CORRECT
005
```

FIG.12A (STANDBY MODE)

```
MEMORY TRANSMISSION     AUGUST 31 (TUE)17:15
SET DRAFT AND SPECIFY ADDRESS

MEMORY REMAINING: 100%
```

↓ [PREDETERMINED OPERATION]

FIG.12B (REPORTING TIMING INPUT MODE)

```
REPORTING TIMING        INPUT
                        REPORTING TIMING
PRESS [*] TO SELECT, PRESS [←][→],
AND PRESS [YES]
MONDAY: NO              TIME:■■:■■
```

[INPUT REPORTING TIMING AS MONDAY: YES, AND TIME 17:15]

↓ [REPORTING TIMING] 

FIG.12C

```
REPORTING TIMING

PRESS [YES], OR
                        [NO] TO CORRECT
MONDAY: YES             TIME: 17:15
```

FIG.13A (STANDBY MODE)

```
MEMORY TRANSMISSION    AUGUST 31 (TUE)17:15
SET DRAFT AND SPECIFY ADDRESS

MEMORY REMAINING: 100%
```

↓ [PREDETERMINED OPERATION]

FIG.13B (BACKUP REPORTING DESTINATION INPUT MODE)

```
BACKUP REPORTING    INPUT DESTINATION
DESTINATION                                    [INPUT BACKUP
                                                REPORTING
                    PRESS [YES]                 DESTINATION,
                                                AS abc_bk@xxx.yy.zz]
■■■■■■■■■■
```

↓ [REPORTING DESTINATION]

FIG.13C

```
BACKUP REPORTING DESTINATION

PRESS [YES], OR
abc_bk@xxx.yy.zz    [NO] TO CORRECT
```

[TRANSMISSION]
| DATE | TIME | DEST. | MODE | TIME | PAGE | RESULT | FILE |
|---|---|---|---|---|---|---|---|
| 10APL | 11:44 | YKHM-BR | G3ESM | 0' 24" | 1P | OK | 0183 |
| | 11:58 | SPPR-BR | G3DM | 1' 32" | 4P | OK | 0184 |
| | 12:17 | OMR-BR | G3FM | 1' 54" | 5P | NG | 0186 |

...

[RECEPTION]
| DATE | TIME | SENDER | MODE | TIME | PAGE | RESULT | FILE |
|---|---|---|---|---|---|---|---|
| 10APL | 12:14 | HRSM-BR | G3SM | 0' 42" | 2P | OK | 0185 |
| | 13:17 | 0312345 | G3DM | 0' 34" | 1P | OK | 0187 |
| | 14:45 | NGN-BR | G3ESM | 0' 52" | 1P | OK | 0188 |

FIG.14

NETWORK FACSIMILE APPARATUS

BACKGROUND

1. Technical Field

This disclosure relates to a network facsimile apparatus, and, in particular, to a technology in carrying out an electronic-mail transmission of a communication management report concerning facsimile communications performed in the network facsimile apparatus.

2. Description of the Related Art

Conventionally, communication management information obtained from collecting communication management reports output from a facsimile apparatus is used for management of the total number of sheets of facsimile communication documents/letters, communication bill calculation, management of communication results, or so. However, since, conventionally, communication management reports are provided by sheets of paper, they may be erroneously taken away by an unauthorized person together with another document, and, thus, may be lost in some case. Accordingly, actually it may not be possible for an authorized person to completely collect the communication management reports.

Japanese laid-open patent application No. 2000-261640 proposes a method for solving such a problem for example. According to this related art (referred to as a first related art), upon receiving a predetermined command e-mail (electronic mail) requesting communication management information via a communication network, for example, the Internet, a facsimile apparatus transmits a communication management report to the source of the command. According to this method, there is no need to output the report by a sheet of paper, and, thus, no case occurs where the report is lost.

Japanese laid-open patent application No. 10-98606 discloses another configuration of providing report data without using paper resource. In this configuration (referred to as a second related art), when a number of records in the report data reaches a predetermined value in a relevant communication terminal apparatus, the report data stored is transmitted to a computer via a communication network.

However, even in the method according to the first related art, the command e-mail may not be necessarily issued only when the communication management information cumulatively stored in a storage device in the machine becomes full so that it should be then renewed. Accordingly, the communication management information thus collected in a user may include duplication or a lack in the information of record. There is a need for a system by which the user can collect the communication management information efficiently without omission in the information.

According to the second related art, the information is transmitted to the predetermined computer via the communication network when the number of records stored until then reaches a predetermined number. However, a user may wish that a timing of such a transmission of the information may be set or specified according to various requirements other than simply the number of records stored.

BRIEF SUMMARY

In an aspect of this disclosure, there is provided a network facsimile apparatus in which a user can efficiently collect communication management information without omission in the information, and thus improve a user's convenience in using and operating the machine properly.

In another aspect of this disclosure, there is provided a network facsimile apparatus in which communication management information can be collected according to even various items of requirements of a user, and thus the user's convenient can be further improved.

Accordingly, there is provided in an exemplary embodiment a configuration of a network facsimile apparatus in which a timing at which a report of communication management information is sent to a host apparatus or so can be set by a user or supervisory person even in various items in various ways, and, thus, the user/supervisory person can obtain the information in various items in various ways according to the user's requirements. Accordingly, the user can perform management work concerning the operation of the network facsimile apparatus efficiently by collecting only necessary information.

BRIEF DESCRIPTION OF THE DRAWINGS

Other aspects, features and advantages will become more apparent from the following detailed description when read in conjunction with the accompanying drawings:

FIGS. 7A through 7E illustrate an example of a guidance given by the network facsimile apparatus shown in FIG. 1 for an operator, and an operation procedure thus executed by the operator on the apparatus;

FIG. 8 illustrates an example of mail communication setting list printed out by the network facsimile apparatus shown in FIG. 1 for an operator to recognize the current set contents in the apparatus;

FIG. 9 shows a flow chart illustrating an operation performed in the network facsimile apparatus shown in FIG. 1 for performing electronic mail transmission of communication management report performed each time when a predetermined number of communication error occurrences is reached by an actual cumulative number of error occurrences;

FIGS. 11A through 11C illustrate an example of a guidance given by the network facsimile apparatus shown in FIG. 1 for an operator, and an operation procedure thus executed by the operator on the apparatus for communication error reporting;

FIGS. 12A through 12C illustrate an example of a guidance given by the network facsimile apparatus shown in FIG. 1 for an operator, and an operation procedure thus executed by the operator on the apparatus for setting a reporting timing;

FIGS. 13A through 13C illustrate an example of a guidance given by the network facsimile apparatus shown in FIG. 1 for an operator, and an operation procedure thus executed by the operator on the apparatus for mail backup transmission; and FIG. 14 illustrates an example of a communication management report in general.

DETAILED DESCRIPTION OF THE PREFERRED EMBODIMENTS

Figure 1:
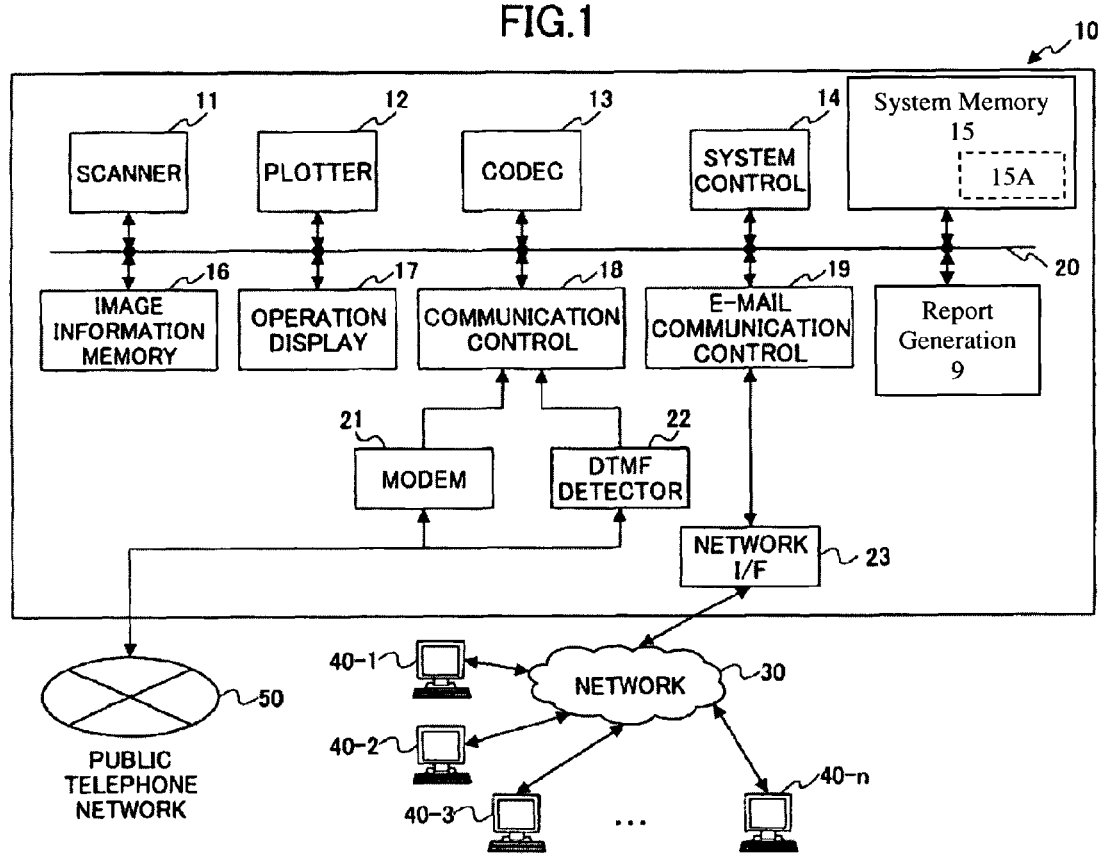
FIG. 1 shows a block diagram of a network facsimile apparatus according to an embodiment of the present invention.

According to the present invention, preferably, a network facsimile apparatus includes a display unit to display the contents of operation or operation guidance, an output unit to output various reports/lists, an input unit for an operator to input data according to the guidance displayed on the display unit, a memory device to store the thus-input data, a facsimile transmission/reception device, an electronic mail transmission/reception device to transmit or receive electronic mails to or from a host apparatus(es) connected to a communication network, a communication result information storage device to store communication result information, and a communication management unit to manage the communication result information.

Furthermore, when predetermined requirements are satisfied, the network facsimile apparatus may send out a communication management report including the communication result information via electronic mail to a destination which is previously registered. According, the communication management information can be collected efficiently without omission in the information, and the user's convenience can be improved.

Moreover, in the network facsimile according to the present invention, when the communication result information storage device becomes full in its storage capacity, a communication management report including communication result information may be transmitted via an electronic mail, to the address(es) previously registered. Accordingly, the user can collect the communication management information efficiently without omission, and the user's convenience can be further improved.

Further, based on previously registered user code and communication charge rate, according to a predetermined procedure, a communication management report including communication result information may be transmitted via an electronic mail, to the address(es) previously registered when the communication charge result thus obtained reaches a predetermined value for the user code. Accordingly, the predetermined supervisory person can know the communication charge result for each user timely, and, thus, even in case the communication charge result on a particular user exceeds the estimation, the supervisory person can know such a situation timely. Further, the information thus collected can be utilized in analysis in total cost management which will be made by the supervisory person afterward. Thus the user's convenience can be further improved.

Further, based on previously registered user code and number of communication records, according to a predetermined procedure, a communication management report including communication result information may be transmitted via electronic mail, to the address(es) previously registered when the number of communication records thus obtained as the communication result reaches a predetermined value for the user code. Accordingly, the predetermined supervisory person can know the number of communication records for each user timely, and, thus, even in case the number of communication records on a particular user exceeds the estimation, the supervisory person can know such a situation timely. Further, the information thus collected can be utilized in analysis in counting management which will be made by the supervisory person afterward. Thus the user's convenience can be further improved.

Furthermore, when a previously registered specific date/time is reached according to a predetermined procedure, the communication management report including communication result information may be transmitted via electronic mail, to the address(es) previously registered. Accordingly, the predetermined supervisory person can receive the communication management report periodically, and, thus, the information thus collected can be utilized in analysis in counting management which will be made by the supervisory person afterward. Thus the user's convenience can be further improved.

Moreover, the communication management report including communication result information may be transmitted via electronic mail to the address(es) previously registered when the number of communication records concerning abnormal or failure communication occurrences reaches a predetermined threshold. Accordingly, the predetermined supervisory person can recognize timely some trouble in the communication machine or other communication facilities or so. Thus the user's convenience can be further improved.

The communication management report may include communication management information of periodic occasions of, if any, transmission errors which occur, at previously registered intervals, according to a predetermined procedure. Accordingly, the supervisory person can periodically recognize an occasion of transmission errors timely, and, thus a proper action for countermeasure thereto can be provided timely. Thus the user's convenience can be further improved.

Moreover, by inserting the reason for transmission into a mail title of each electronic mail including the communication management report, the supervisory person or user who has received it can recognize the contents of the report easily. Thus the user's convenience can be further improved.

With reference to the figures, a configuration of a network facsimile apparatus according to one embodiment of the present invention will now be described in detail.

FIG. 1 shows a block diagram showing the network facsimile apparatus according to the embodiment of the present invention. The network facsimile apparatus 10 includes a scanner 11 for reading a draft image to be transmitted, a plotter 12 for printing out an image received, a CODEC 13 for appropriately transforming data form of the image data to be received/transmitted, a system control 14 which controls the entire apparatus, a system memory 15 utilized appropriately by the system controller, an image information memory 16 storing image data for facsimile transmission/reception, an operation display 17 as a user interface, a communication control 18 for facsimile communications, and an e-mail communication control 19.

These respective parts are connected mutually via an internal bus 20. A modem 21 and a DTMF detector 22 are connected to the communication control 18. A network I/F 23 are connected to the e-mail communication control 19. A plurality of host apparatuses 40-1 through 40-n, as well as the network I/F 23 in the apparatus, are connected to a network 30 such as the Internet.

The scanner 11 reads a draft or a document to be sent. The plotter 12 records image information, a report, an answering sheet, etc. received. The CODEC 13 performs coding/decoding on image information. The system control 14 manages the entire system control. The system memory 15 is a memory which is used as a work area used by the system control operation made by the system control 14. The image information memory 16 stores image information if necessary in processing of image/drawing data in facsimile communication operation. The operation display 17 includes keys, LEDs, LCDs, etc., and gives guidance/instructions to a user and accepts operation made by the user according to the guidance/instructions given. The communication control 18 manages facsimile transmission control. The e-mail communication control 19 manages electronic mail transmission and reception.

The modem 21 performs modulation/demodulation on an analog signal between a public telephone network 50 and communication control operation performed by the communication control 18. The DTMF detector 22 detects a DTMF signal sent from the public telephone network 50. The network facsimile apparatus 10 performs the facsimile transmission/reception with other apparatus via the public telephone network 50 such as a PSTN. The network I/F 23 acts as an interface for connecting the apparatus 10 with the communication network 30, and for example, is made of an NIC (Network Interface Card), etc.

Figure 2:
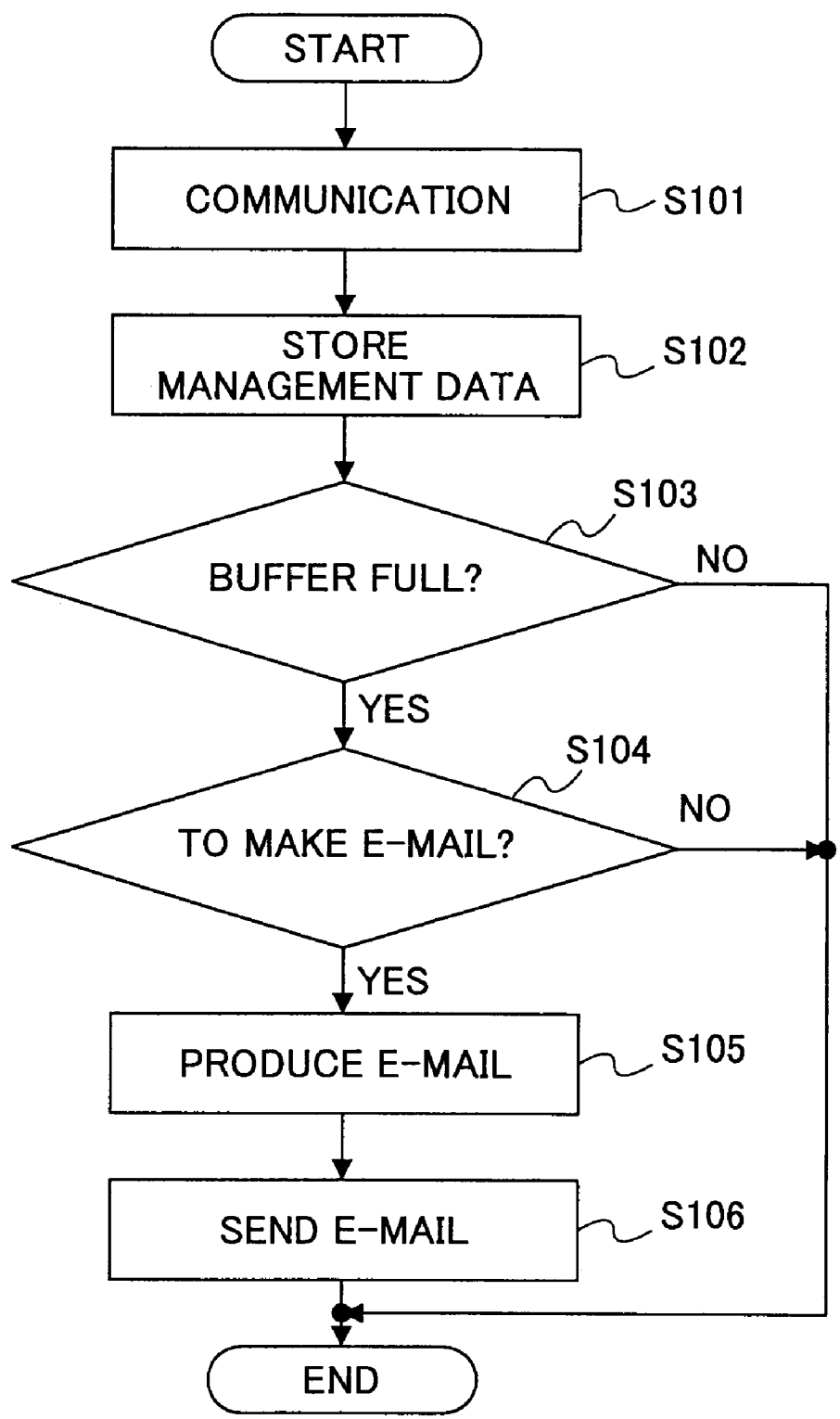
FIG. 2 shows a flow chart illustrating an operation performed in the network facsimile apparatus shown in FIG. 1 for performing electronic mail transmission of communication management report performed when a predetermined storage capacity becomes full of cumulative communication management information.

FIG. 2 shows a flow chart which shows operation of the network facsimile apparatus 10 shown in FIG. 1. The operation of FIG. 2 is performed in a case where, upon a communication management buffer (or other storage) 15A provided in the system memory 15 becoming full in its storage capacity, a communication management report is produced by a report generation part 9 of the network facsimile apparatus automatically from communication management information stored, and the report is transmitted via electronic mail automatically.

First, an operation for a facsimile transmission is performed (in Step S101). After producing and storing communication management data concerning the facsimile transmission (in Step S102), it is determined whether or not the communication management buffer becomes full in its storage capacity (in Step S103). When it has not become full yet (No in Step S103), the current processing is terminated. When it has become full (Yes in Step S103), it is determined whether or not a setting is previously made such that the report is transmitted via an electronic mail (in Step S104). When such a setting is not made, the current processing is terminated (NO in Step S104).

When such a setting is previously made, the communication management report is produced (Yes in Step S104, and in Step S105), and the report is transmitted via electronic mail (in Step S106). A subject name of the electronic mail is 'a communication management report—automatic output report', for example. The contents of the communication management report are such as those shown in FIG. 14, for example. As shown, the communication management report may recite the communication management data produced and stored for each occurrence of communication operation such as a facsimile transmission/reception operation performed, such as date (DATE) and time (TIME) at which the relevant communication is performed, the name (DEST./SENDER) of a destination which the communication is addressed or a sender from which the communication is sent, data communication mode (MODE) currently applied, a time duration (TIME) taken for the communication, the total number of pages (PAGE) of the relevant facsimile transmission, the result (RESULT) of the communication (success/failure), and the file identification number (FILE) of the communication.

In the example described above, the communication management buffer may be cleared after the communication management information is transmitted via electronic mail as mentioned above, so that new data may be stored there subsequently.

Figure 3:
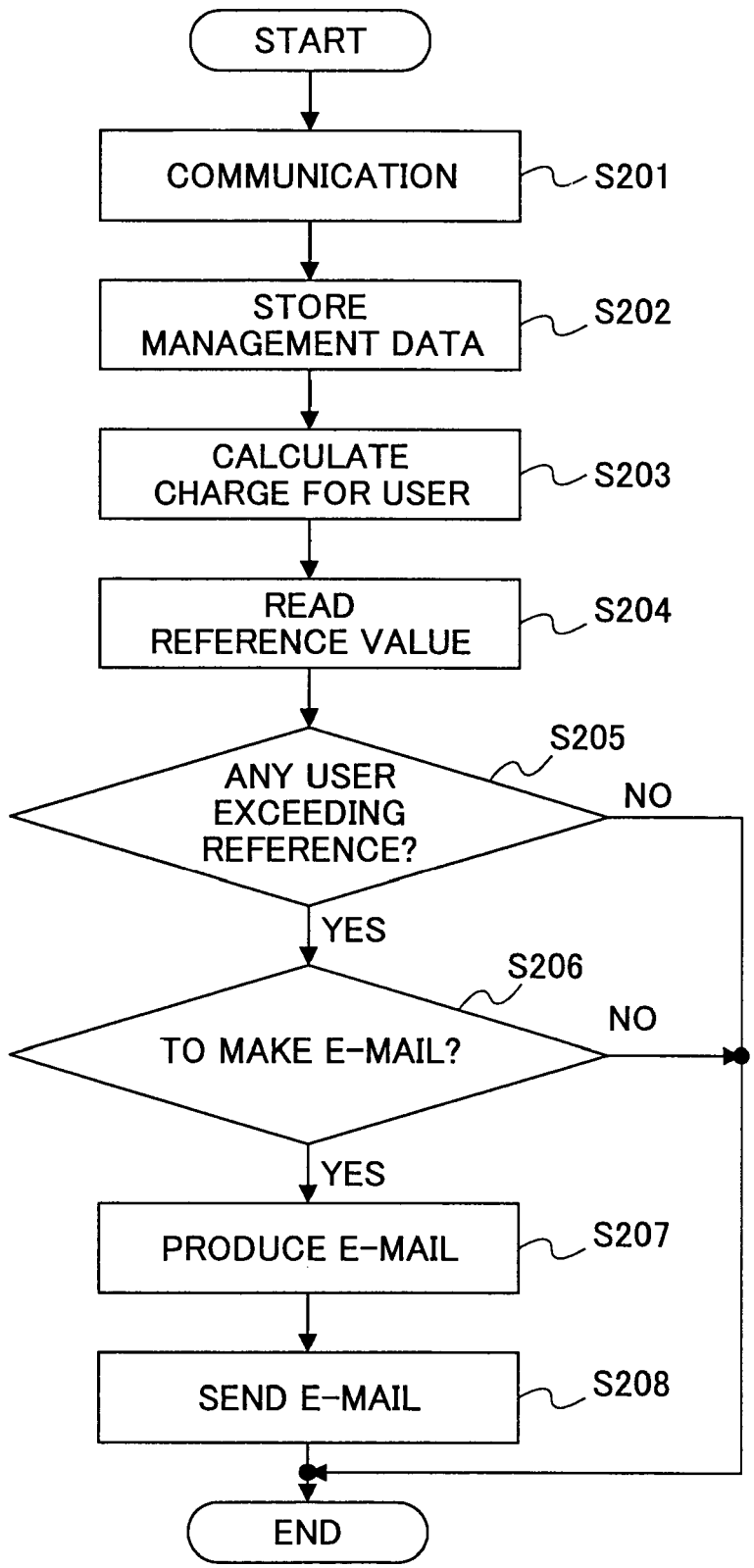
FIG. 3 shows a flow chart illustrating an operation performed in the network facsimile apparatus shown in FIG. 1 for performing electronic mail transmission of communication management report performed when a predetermined communication charge is reached by a calculated cumulative one occurring due to actual communications performed by the apparatus.

FIG. 3 is a flow chart which shows another operation of the network facsimile apparatus 10. The operation shown in FIG. 3 corresponds to operation in which the communication management report is automatically transmitted via electronic mail when a cumulative communication charge result calculated for each particular user code previously registered in the network facsimile apparatus 10 exceeds a predetermined value. This case assumes that the network facsimile apparatus 10 is shared by a plurality of users, each user has his/her own unique user code, and the user code should be input when each user uses this network facsimile apparatus 10.

First, an operation for a facsimile transmission is performed (in Step S201). After producing and storing a communication management data in a predetermined format such as that mentioned above and including the user code (in Step S202), a communication charge/fare is calculated for each communication occurrence for each user code (in Step S203), and a reference communication charge value previously registered in the network facsimile apparatus 10 is read out (in Step S204). After that, the reference communication charge value is compared with the actual cumulative communication charge result calculated for each user code, and, thus, it is determined whether or not there is any user code for which the actual cumulative communication charge result exceeds the reference communication charge value (in Step S205).

When there is no record (No in Step S205), the current processing is terminated. Otherwise, when there occurs any (Yes in Step S205), it is determined whether or not a setting is previously made such that a report is sent out via electronic mail (in Step S206). When there is no such a setting (No in Step S206), the current processing is terminated. However, otherwise, when such a setting is previously made (Yes in Step S206), the communication management report is produced by the report generation part 9 from the communication management information in the communication management buffer 15A, and is transmitted to host apparatuses 40 via the communication network 30 via electronic mail (in Step S208).

The subject name of the electronic mail is, for example, 'communication management report—charge excess report'. In the above-mentioned case, the common or particular reference communication charge is registered for each user. However, instead, it is also possible that the total communication charge for all the user codes may be registered as a reference value to be compared with the actual total. Further, actually, the communication management report to be transmitted may be one which is appropriately modified from the original communication management information stored in the communication management buffer such that the information is sorted for every user code, or so.

Figure 4:
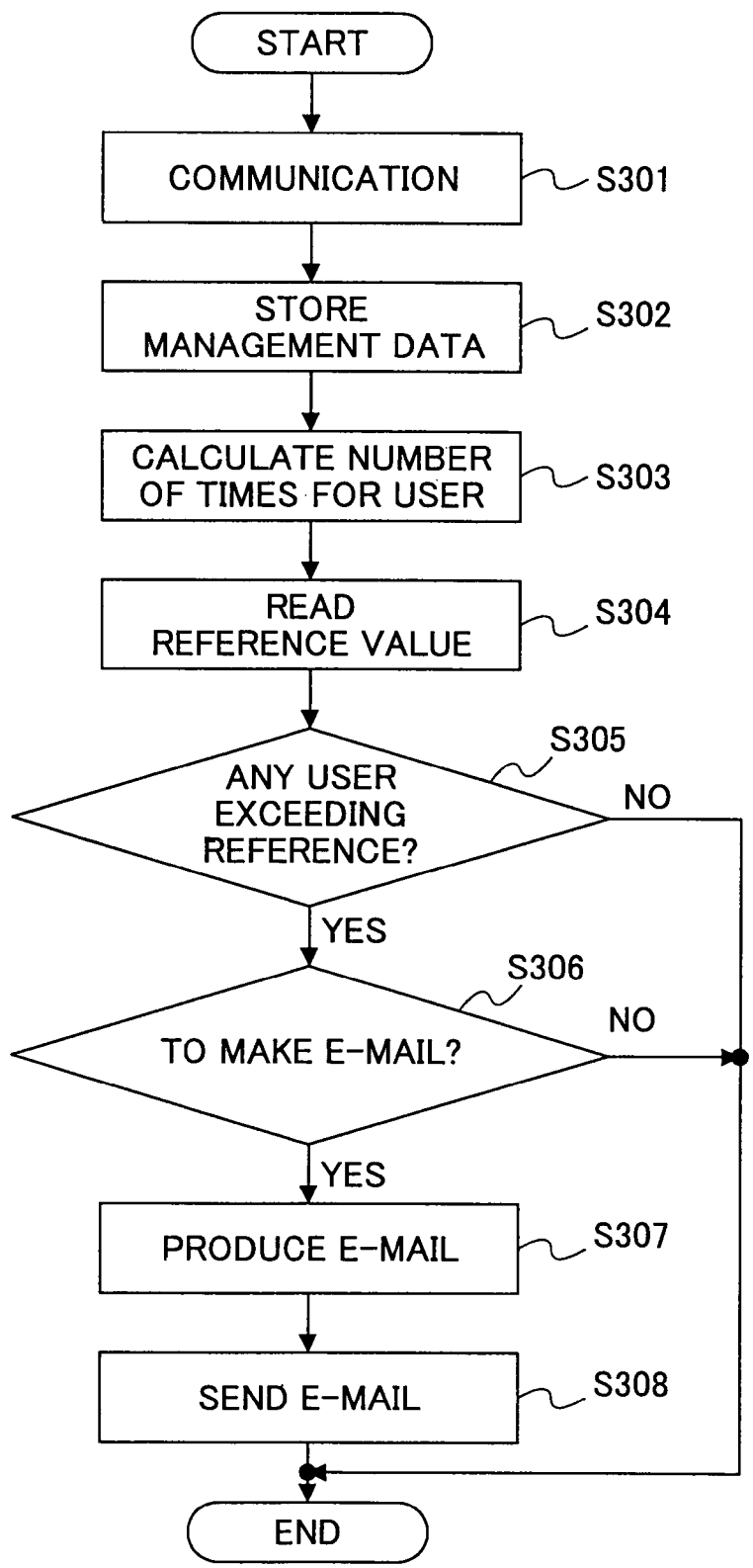
FIG. 4 shows a flow chart illustrating an operation performed in the network facsimile apparatus shown in FIG. 1 for performing electronic mail transmission of communication management report performed when a predetermined number of communication occurrences is reached by an actual cumulative one occurring due to actual communications performed by the apparatus.

FIG. 4 is a flow chart which shows another operation of the network facsimile apparatus 10 shown in FIG. 1. The operation shown is an operation in which the communication management report is transmitted via electronic mail when the total cumulative number of communication occurrences (i.e., how many times a facsimile transmission has been performed in this apparatus) recorded for each user code exceeds a predetermined reference value registered previously in the network facsimile apparatus 10.

First, an operation for a facsimile transmission is performed (in Step S301). Then, after producing and storing the communication management data on the communication (in Step S302), the cumulative number of communication operations occurring is calculated/updated for every user code (in Step S303). And then, a reference number of communication operations previously registered is read (in Step S304). Then, the reference number of communication operations is compared with the number of communication operations actually occurring recorded for every user code, and it is determined whether or not there is any user code for which the cumulative number of communication operations occurring exceeds the reference number (in Step S305).

When there is none exceeding, the current processing is terminated (No in Step S305). Otherwise, when any exceeding the reference number, then it is determined whether or not a setting of performing e-mail (electronic mail) report is previously made (Yes in Step S305, and in Step S306). When such a setting is not made, the current processing is terminated (No in Step S306). Otherwise, when such a setting is previously made, an electronic mail transmitting the communication management report is produced (Yes in Step S306, and in Step S307). Then, e-mail transmission of the communication management report is carried out (in Step S308). The subject name of the electronic mail may be 'communication management report—communication number excess report', for example.

In the above-mentioned case, the reference communication number is registered for each user. However, instead, it is also possible that the total communication number for all the user codes may be registered as a reference value to be compared with the actually total values. Further, actually, the communication management report to be transmitted may be one which is appropriately modified from the original communication management information stored in the communication management buffer 15A, such that the information is sorted for every user code, or so.

Figure 5:
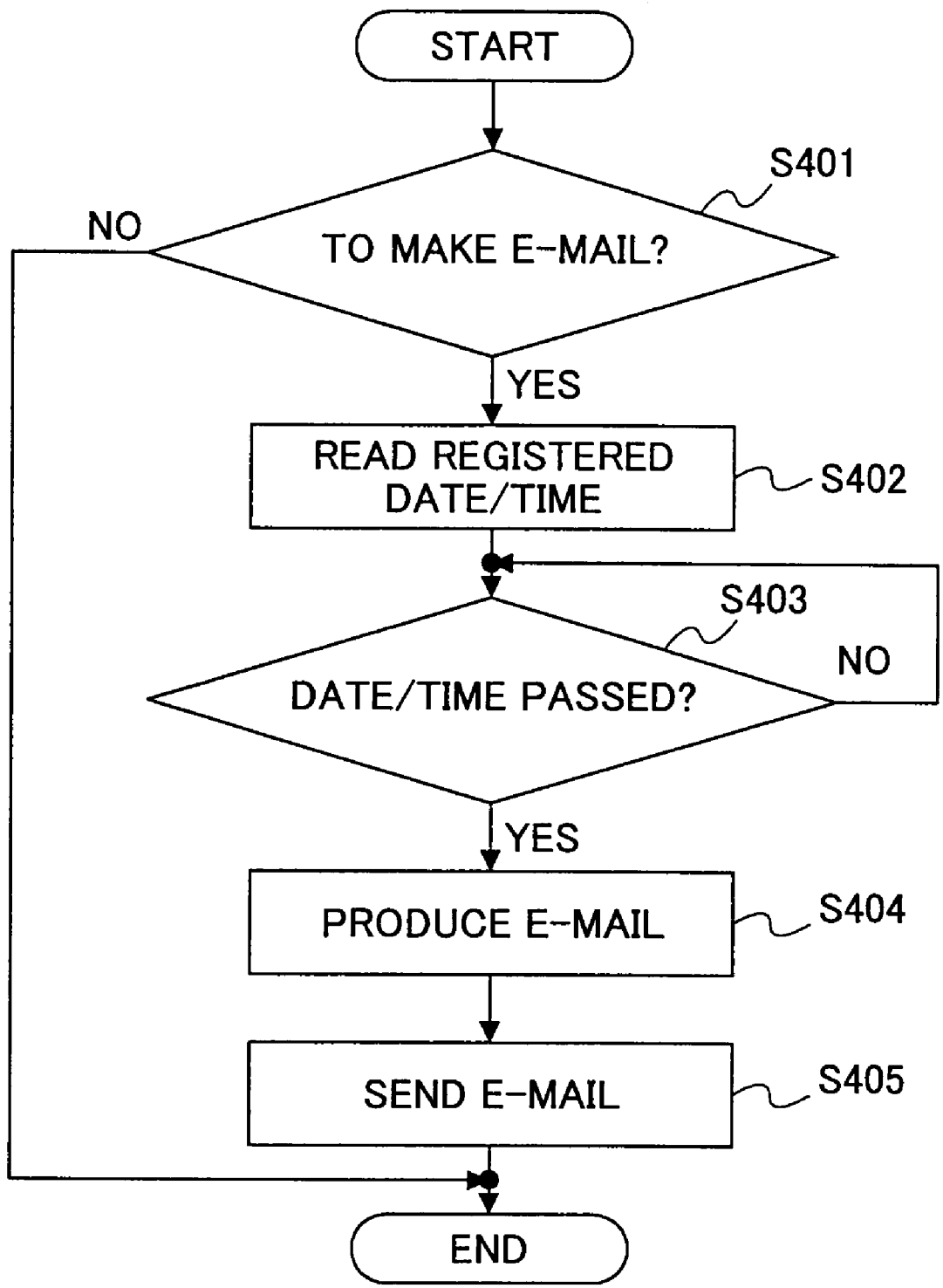
FIG. 5 shows a flow chart illustrating an operation performed in the network facsimile apparatus shown in FIG. 1 for performing electronic mail transmission of communication management report performed periodically.

FIG. 5 is a flow chart which shows another operation of the network facsimile apparatus shown in FIG. 1. The operation shown in this figure is operation in which the communication management report is transmitted via electronic mail periodically based on date/time information registered in this facsimile apparatus 10. First, it is determined whether or not a predetermined setting of e-mail transmission of communication management report is previously made (in Step S401). When no such a setting is made, the processing is terminated (No in Step S401; NO). Otherwise, when such a setting is previously made, the date/time information registered is read out from the system memory (Yes in Step S401, and in Step S402).

Then it is determined whether or not the registered date/time has been passed (step S403). When it has not been passed, no further operation is carried. However, when the registered date/time has been passed, the communication management report is produced by the report generation part 9 from the communication management information (Yes in Step S403, and in Step S404), and e-mail transmission of the communication management report is carried out (in Step S405). The subject name of the e-mail is 'communication management report-periodic report'.

Figure 6:
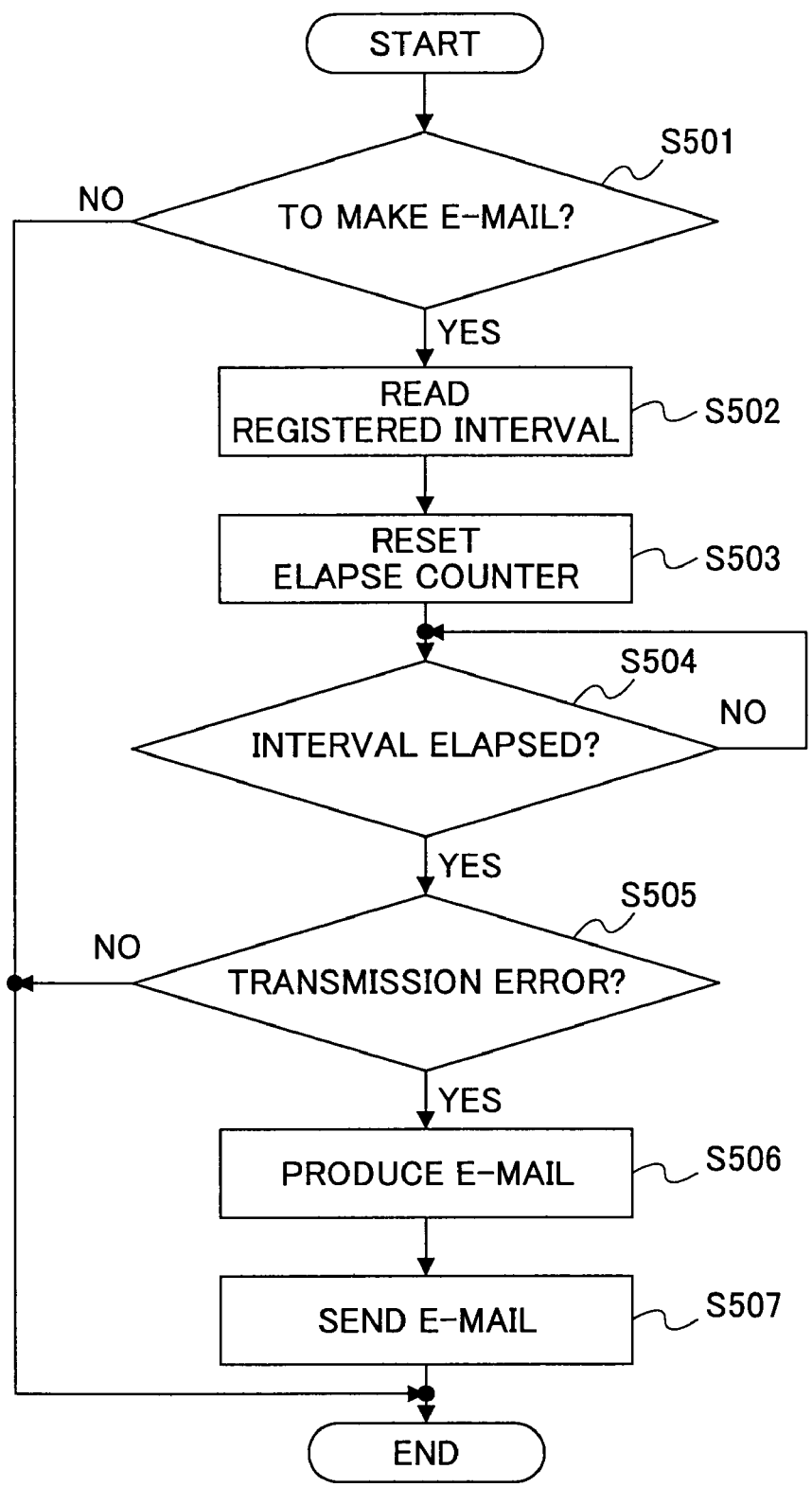
FIG. 6 shows a flow chart illustrating an operation performed in the network facsimile apparatus shown in FIG. 1 for performing periodic electronic mail transmission of communication management report concerning transmission error occurrences.

FIG. 6 is a flow chart which shows another operation of the network facsimile apparatus shown in FIG. 1. The operation shown in this figure is operation in which a communication management report concerning transmission errors is transmitted via electronic mail periodically based on check interval information registered in this facsimile apparatus 10. The transmission error means a facsimile transmission which has not arrived at a destination properly.

First, it is determined whether or not a predetermined setting of e-mail transmission of communication management report is previously made (in Step S501). When no such a setting is made, the processing is terminated (No in Step S501; NO). Otherwise, when such a setting is previously made, the check interval information is read out, and, at the same time, a predetermined elapse time measurement counter is reset to zero (Yes in Step S501, and in Step S502).

Then it is determined whether or not the registered check interval has been elapsed by comparing the count value in the elapse time measurement counter with the registered check interval (step S503). When it has not elapsed, no further operation is carried. However, when the registered interval has elapsed, it is determined whether or not any transmission error has occurred during the interval currently having elapsed (Yes in Step S504, and in S505). Then, when no transmission error has occurred, no further operation is performed. However, if any transmission error has occurred during the interval, the communication management report is produced by the report generation part 9 from the communication management information stored in storage 15A until then (Yes in Step S505, and in Step S506), and e-mail transmission of the communication management report is carried out (in Step S507). The subject name of the e-mail is 'communication management report-transmission error report'.

The communication management information to be reported via the e-mail of the communication management report in this case at least includes information concerning transmission errors occurring during the check interval currently having elapsed. The transmission error means a communication of facsimile transmission or so which is, as mentioned above, even once transmitted but does not arrive at the relevant destination properly. For example, in the ordinary communication management report such as that shown in FIG. 14, the result (RESULT) of 'NG' indicates such a transmission error.

Next, a user can easily change the contents of registration or setting made in the network facsimile apparatus 10 concerning the function of the communication management report described above with reference to FIGS. 2-6, with a procedure/guidance given on the operation display 17 such as that shown in FIGS. 7A through 7E, for example, by the system control 14.

As shown, a guidance message such as "set a document and specify an address" is displayed on the operation display 17 of FIG. 1 in a standby mode, and, according thereto, a user should input a destination address such as an e-mail address of "abc@xxx.yy.zz", for example. Then, after confirming the contents thus input by himself/herself on the display, the user should make various settings also on the operation display 17 as to whether or not the e-mail transmission of the communication management report should be performed in an automatic output timing, whether or not the report should be made when the cumulative communication charge result exceeds the predetermined value, or so, with arrow keys accompanying the operation display 17 operated by the operator, concerning the functions described above with reference to FIGS. 2 through 6.

Furthermore, it is preferable that the plotter 12 prints out 'mail report setting list' such as that shown in FIG. 8, and, thus, the user can easily recognize the contents of current settings concerning the functions described above with reference to FIGS. 2 through 6.

The mail report setting list shown in FIG. 8 indicates the following contents:

For each communication management destination which is previously registered:
- whether or not the report is made in automatic output timing (or periodically);
- whether or not the report is made upon an excess of the cumulative communication charge result over the predetermined value;
- whether or not the report is made upon an excess of the cumulative number of communication occurrences over the predetermined value;
- whether or not periodic report is made, and, if yes, how frequently (interval in days) and what time in the day the report is made; and
- whether or not periodic report of transmission error occurrences is made, and, if yes, how frequently the report is made.

Next, FIG. 9 is a flow chart which shows another operation of the network facsimile apparatus 10. Operation shown in this figure is an operation in a case of making the communication management information mail to the addresses beforehand registered whenever erroneous communication occurrences come to amount a fixed number of times.

First, a communication is made in Step S601. After that, in Step S602, a communication management data thereof is stored. Then, based thereon, in Step S603, it is determined whether or not the relevant communication is finished successfully or failed in result. If it is finished successfully, the current processing is terminated without carrying out any other special operation (No in Step S603). However, if the relevant communication is not finished successfully, the count number of an error counter managed by the system control 14 is incremented by one (Yes in Step S603, and in Step S604), and a previously registered reference value on the number of erroneous communication occurrences in the network facsimile apparatus is read out (in Step S605).

Then, the current count value of the error counter is compared with the registered number of erroneous communication occasions (in Step S606). Then, if the count value does not reach the registered number (No in Step S606), the current processing is terminated without carrying out any other special operation. However, if the count value has reached the registered number, the count value of the error counter is cleared to zero (Yes in Step S606, and in Step S607), an electronic mail of the communication management information including these erroneous communication occurrences is produced, and is transmitted to the addresses (40-1 through 40-*n*) (in Steps S608 and S609). Then, the current processing is terminated.

The communication management information transmitted in this case should include at least information concerning the actual erroneous communication occurrences, or may further include several times of communication occurrences around the erroneous communication occurrences.

Figure 10:
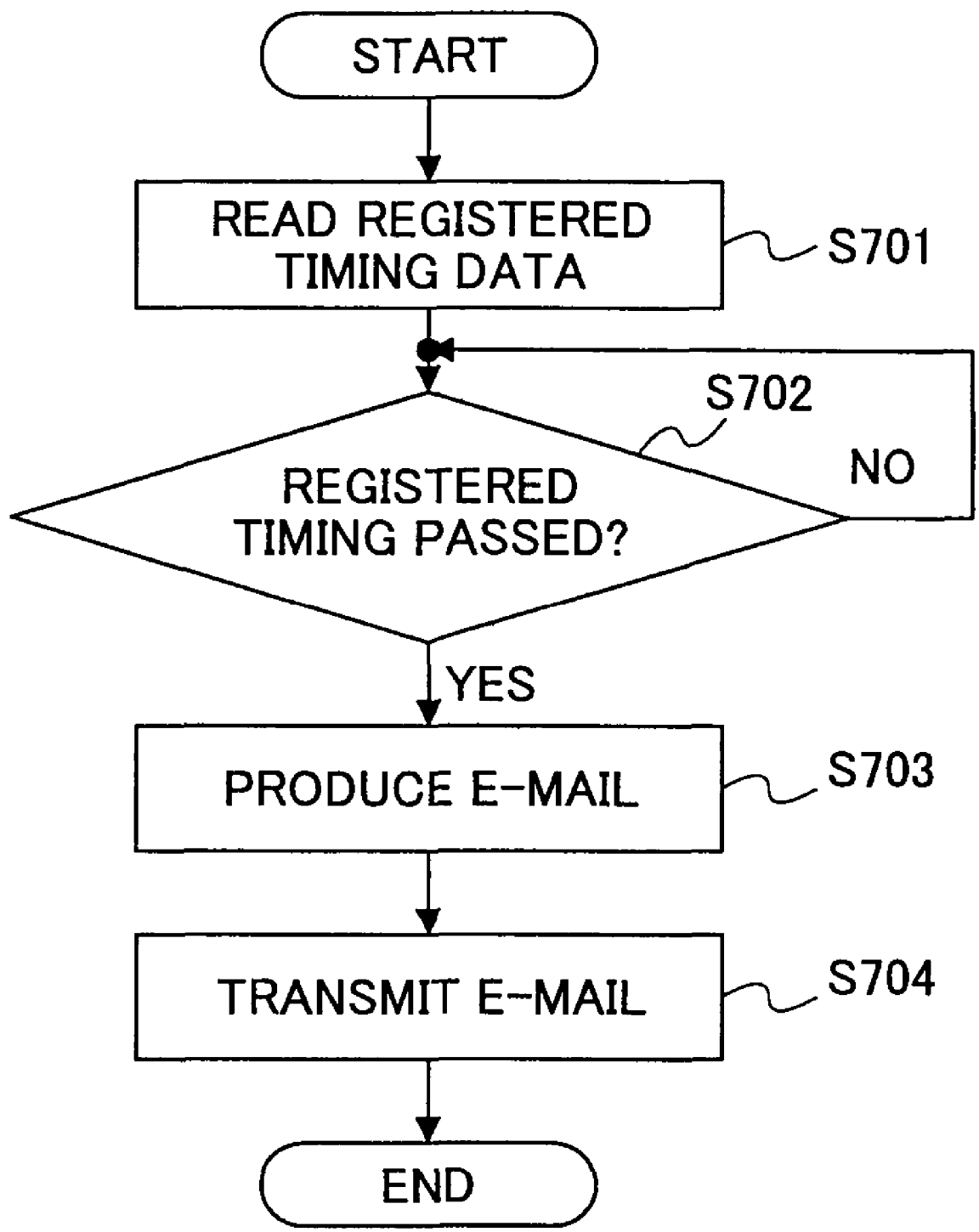
FIG. 10 shows a flow chart illustrating an operation performed in the network facsimile apparatus shown in FIG. 1 for performing electronic mail transmission of communication management report performed periodically based on a predetermined requirement previously registered in the apparatus.

FIG. 10 is a flow chart which shows another operation of the network facsimile apparatus 10. Operation shown in FIG. 10 is an operation in a case of making a communication management report e-mail according to a user code to the addresses (40-1 through 40-*n*) previously registered. First, predetermined date/time information, and may include information of timing as to whether or not the e-mail reporting operation is started in a predetermined day of every week, what time in the day the operation is started and so forth, is read (in Step S701). Then, it is determined in Step S702 whether or not the registered timing is passed. If it is not passed, this monitoring process is continued without carrying out any other special operation (No in Step S702). If the predetermined timing is passed, an electronic mail of the communication management report is created for every user code registered (Yes in Step S702, and in Step S703), the e-mail transmission is carried out to the addresses (40-1 through 40-*n*) registered beforehand (in Step S704). After that, the current processing is terminated.

A user may change the registration and setting of the report transmission destination easily with a procedure/guidance such as those shown FIGS. 11A through 11C, 12A through 12C and 13A through 13C, for example, For example, the registered number of erroneous communication occurrences can be registered into the apparatus with a procedure/guidance as shown in FIGS. 11A through 11C, and the above-mentioned timing in which the e-mail transmission of the report is made can be registered into the apparatus with a procedure/guidance as shown in FIGS. 12A through 12C.

Although these examples set the reporting timing as to whether or not reporting is made at a predetermined day of the week and what time in the day the reporting is performed, it is also possible that any other specific date/time may be set for the timing of the above-mentioned reporting. Further, a reporting destination for the purpose of mail backup may be further registered into the apparatus with a procedure/guidance as shown in FIGS. 13A through 13C, and e-mail transmission may be carried out also to this destination for mail backup at every time of the e-mail transmission. Accordingly, even in a case where the communication management information sent to the first destination via electronic mail is lost by some cause, as the same contents are also sent to the above-mentioned destination for mail backup, the lost information can be restored therefrom.

Further, the present invention is not limited to the above-described embodiments, and variations and modifications may be made without departing from the basic concept of the present invention.

The present application is based on Japanese priority application No. 2002-192072, filed on Jul. 1, 2002, the entire contents of which are hereby incorporated by reference.

What is claimed is:

1. A network facsimile apparatus comprising:
   a facsimile communication control part configured to control facsimile communications by said network facsimile apparatus;
   a communication management storage part configured to store communication management information concerning the facsimile communications controlled by said facsimile communication control part;
   an electronic mail communication control part configured to control electronic mail transmission and reception by said network facsimile apparatus;
   a report generation part configured to generate a communication management report utilizing at least some of the communication management information stored in said communication management storage part;
   a user interface part configured for user input; and
   a communication management destination registration part that registers a plurality of destinations, and
   for each registered destination, when a user, through said user interface part, sets reporting timings at which the communication management report is to be transmitted to the registered destination, registers the reporting timings, set by the user through the user interface, for the registered destination, wherein the communication management report is transmitted to a selected destination at a user-set reporting timing registered for the selected destination.

2. The network facsimile apparatus as claimed in claim 1, wherein the communication management report generated by said report generating part is set to be transmitted at a reporting timing when a total quantity of the communication management information in the communication management storage part exceeds a predetermined amount.

3. The network facsimile apparatus as claimed in claim 1, wherein the communication management report generated by said report generating part is set to be transmitted at a reporting timing when a communication charge for a user reaches a predetermined amount.

4. The network facsimile apparatus as claimed in claim 1, wherein the communication management report generated by said report generating part is set to be transmitted at a reporting timing when a number of communications for a user reaches a predetermined value.

5. The network facsimile apparatus as claimed in claim 1, wherein the communication management report generated by said report generating part is set to be transmitted at a reporting timing when predetermined date and/or time arrives.

6. The network facsimile apparatus as claimed in claim 1, wherein the communication management report generated by said report generating part is set to be transmitted at a reporting timing when a number of communication failures exceeds a predetermined value.

7. The network facsimile apparatus as claimed in claim 1, wherein said communication management report comprises communication management information concerning occurrences of communication error.

8. The network facsimile apparatus as claimed in claim 1, wherein a mail title of the electronic mail transmitting the communication management report indicates a reason for the transmission.

9. The network facsimile apparatus as claimed in claim 1, wherein the communication management report is additionally transmitted by electronic mail to another destination for mail backup.

* * * * *